US012710666B2

(12) United States Patent
Dal Pont

(10) Patent No.: US 12,710,666 B2
(45) Date of Patent: Aug. 18, 2026

(54) FOLDING EYEGLASSES

(71) Applicant: LUXOTTICA S.R.L., Agordo (IT)

(72) Inventor: Moreno Dal Pont, Belluno (IT)

(73) Assignee: LUXOTTICA S.R.L., Agordo (IT)

( * ) Notice: Subject to any disclaimer, the term of this patent is extended or adjusted under 35 U.S.C. 154(b) by 350 days.

(21) Appl. No.: 18/250,050

(22) PCT Filed: Nov. 2, 2021

(86) PCT No.: PCT/IB2021/060116
§ 371 (c)(1), (2) Date: Apr. 21, 2023

(87) PCT Pub. No.: WO2022/091064
PCT Pub. Date: May 5, 2022

(65) Prior Publication Data
US 2023/0400706 A1 Dec. 14, 2023

(30) Foreign Application Priority Data
Nov. 2, 2020 (IT) ........................ 102020000025978

(51) Int. Cl.
*G02C 5/08* (2006.01)
*G02C 5/20* (2006.01)
*G02C 5/22* (2006.01)

(52) U.S. Cl.
CPC ................ *G02C 5/08* (2013.01); *G02C 5/20* (2013.01); *G02C 5/2236* (2013.01)

(58) Field of Classification Search
CPC ....... G02C 5/08; G02C 5/20; G02C 5/22–229
See application file for complete search history.

(56) References Cited

U.S. PATENT DOCUMENTS 1,970,044 A * 8/1934 Klein ........................ G02C 5/08 351/122
D697,128 S * 1/2014 Szymanski .................. D16/303
(Continued)

FOREIGN PATENT DOCUMENTS

CN 107024778 A * 8/2017 ............... G02C 5/20
DE 3230234 A1 2/1984
FR 2875914 A1 3/2006
(Continued)

OTHER PUBLICATIONS

Machine translation of CN-107024778-A retrieved electronically from Espacenet Jun. 11, 2025 (Year: 2025).*
(Continued)

*Primary Examiner* — Cara E Rakowski
(74) *Attorney, Agent, or Firm* — CANTOR COLBURN LLP

(57) ABSTRACT

Folding eyeglasses include a front which supports a pair of lenses and a pair of temples hinged to the front, each one of the temples has a proximal portion and a distal portion which are mutually hinged by a hinge. The hinge includes a multi jointed central body configured to allow a first 90° rotation of the distal portion of the temple and a further 90° rotation of the multi jointed central body with respect to the proximal portion of the temple, in order to arrange the proximal portion of the temple and the distal portion of the temple so that they are mutually parallel and superimposed.

10 Claims, 11 Drawing Sheets

(56) References Cited

U.S. PATENT DOCUMENTS

| | | | | |
|---|---|---|---|---|
| 2004/0100615 A1* | 5/2004 | Conner | .................... | G02C 5/20<br>351/63 |
| 2017/0242267 A1 | 8/2017 | Barnett et al. | | |

FOREIGN PATENT DOCUMENTS

| | | | |
|---|---|---|---|
| KR | 101917985 | B1 | 1/2019 |
| WO | 2015101910 | A2 | 7/2015 |
| WO | 2018036056 | A1 | 3/2018 |

OTHER PUBLICATIONS

Machine translation of FR28575914 retrieved electronically from Espacenet Jun. 11, 2025 (Year: 2025).*
International Search Report for International Application No. PCT/IB2021/060116, dated Feb. 14, 2022, 4 pages.
Italian Search Report for Italian Application No. 102020000025978, dated Jun. 25, 2021, 9 pages.
Written Opinion for International Application No. PCT/IB2021/060116, dated Feb. 14, 2022, 7 pages.

* cited by examiner 1
25
2a
22
24
22
20
21
23
2b
3
4a
7a
9a
5
6
7b
9b
4
4b
25
4a
7a
9a
5
6
7b
9b
4
4b 4b
8b
7b
10b
6b
6a
10a
7a
8a
4a
13
5
13

1
9b
6
9a
25
4b
7b
5
7a
4
4a
3
2
3

4b
7b
5
7a
4
4a
9b
6
9a
25

FOLDING EYEGLASSES

CROSS-REFERENCE TO RELATED APPLICATIONS

This application is a 35 U.S.C. § 371 National Stage patent application of PCT/IB2021/060116, filed on 2 Nov. 2021, which claims the benefit of Italian patent application 102020000025978, filed on 2 Nov. 2020, the disclosures of which are incorporated herein by reference in their entirety.

TECHNICAL FIELD

The present disclosure relates to folding eyeglasses. More particularly, the disclosure relates to folding eyeglasses which can be folded in order to occupy as little space as possible.

BACKGROUND

As is known, folding eyeglasses are available commercially in which, however, the folding mechanism of the eyeglasses does not allow a packing of the eyeglasses with the smallest possible volume, i.e., with an extremely reduced thickness given by the superimposition of temples and lenses, with a simple action requiring negligible effort by the user.

SUMMARY

The aim of the present disclosure is to provide folding eyeglasses which can be folded so as to obtain the smallest possible space occupation in thickness, with at the same time the smallest possible required folding effort.

Within this aim, the present disclosure provides folding eyeglasses in which the folding thickness obtained by folding the eyeglasses, therefore by superimposing the lenses on themselves with the temples, is smaller with respect to folding eyeglasses of the known type.

the disclosure also provides folding eyeglasses in which folding occurs both at the temple level and at the front level.

The present disclosure further provides folding eyeglasses that are highly reliable, simple to provide and at competitive costs.

This aim and these and other advantages which will become better apparent hereinafter are achieved by providing folding eyeglasses, comprising a front which supports a pair of lenses and a pair of temples hinged to the front, each one of said temples comprising a proximal portion and a distal portion which are mutually hinged by means of a hinge, characterized in that said hinge comprises a multi jointed central body configured to allow a first 90° rotation of the distal portion of the temple, and a further 90° rotation of the multi jointed central body with respect to the proximal portion of the temple, in order to arrange the proximal portion of the temple and the distal portion of the temple so that they are mutually parallel and superimposed.

BRIEF DESCRIPTION OF THE DRAWINGS

Further characteristics and advantages of the disclosure will become better apparent from the description of a preferred but not exclusive embodiment of the eyeglasses according to the disclosure, illustrated by way of non-limiting example in the accompanying drawings, wherein.

DETAILED DESCRIPTION OF THE DRAWINGS

Figure 1:
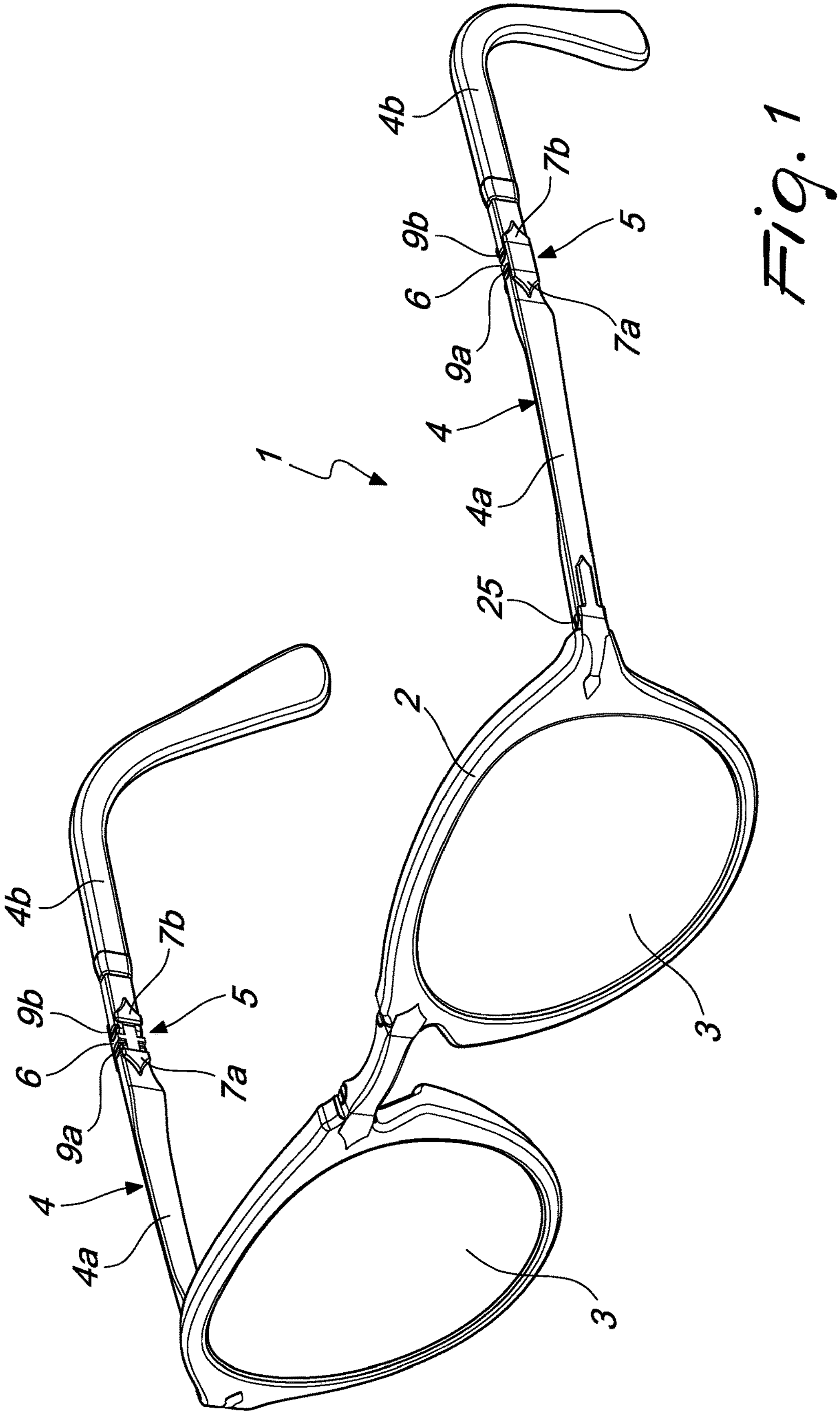
FIG. 1 is a perspective view of the folding eyeglasses according to the present disclosure.
Figure 2B:
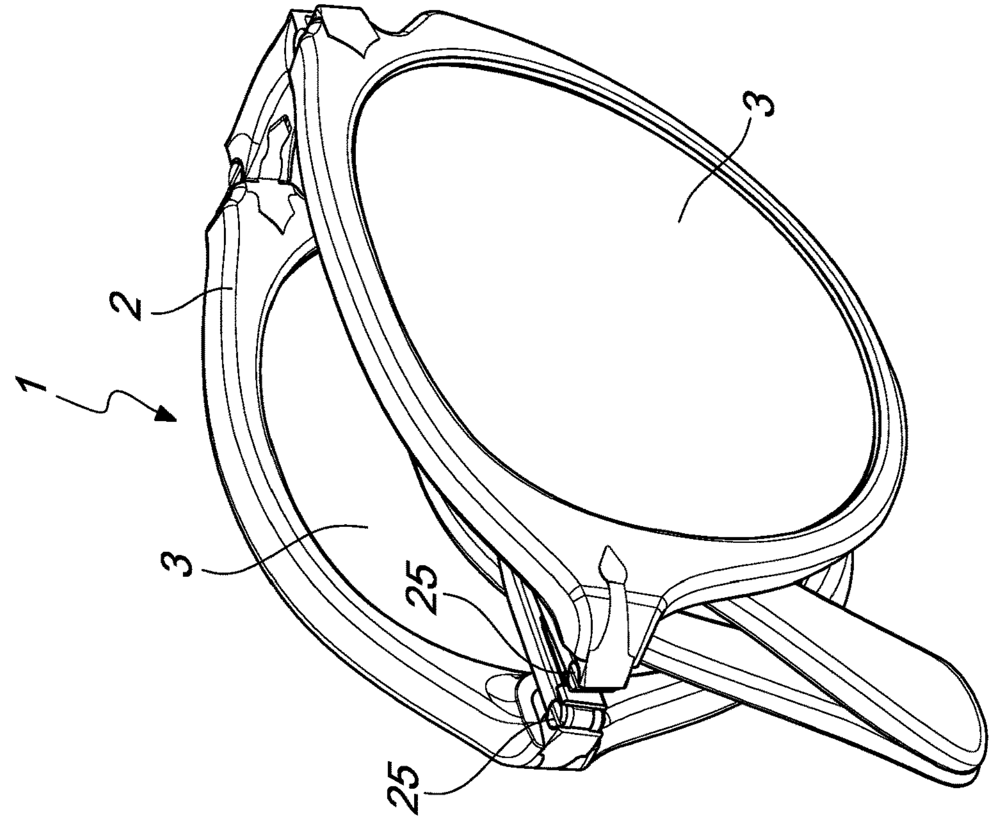
FIG. 2*b* is a further perspective view, from the opposite side of FIG. 2*a*, of the folding eyeglasses according to the disclosure in a folded configuration.
Figure 2A:
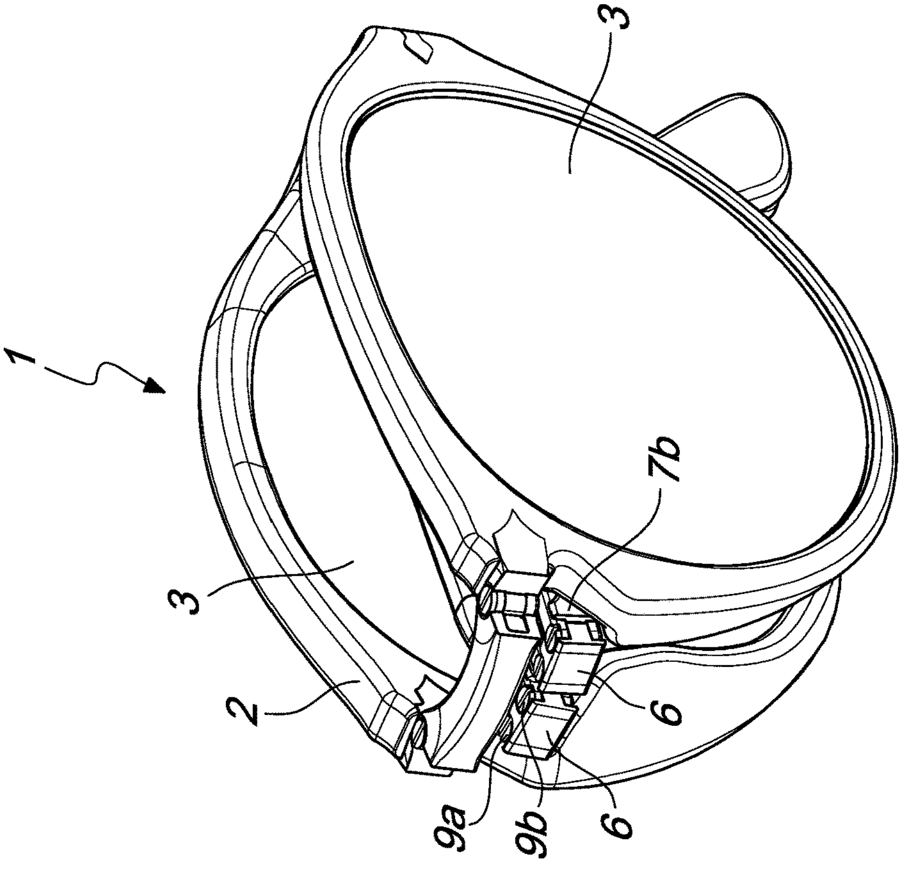
FIG. 2*a* is a perspective view of the folding eyeglasses according to the disclosure in a folded configuration.
Figure 3:
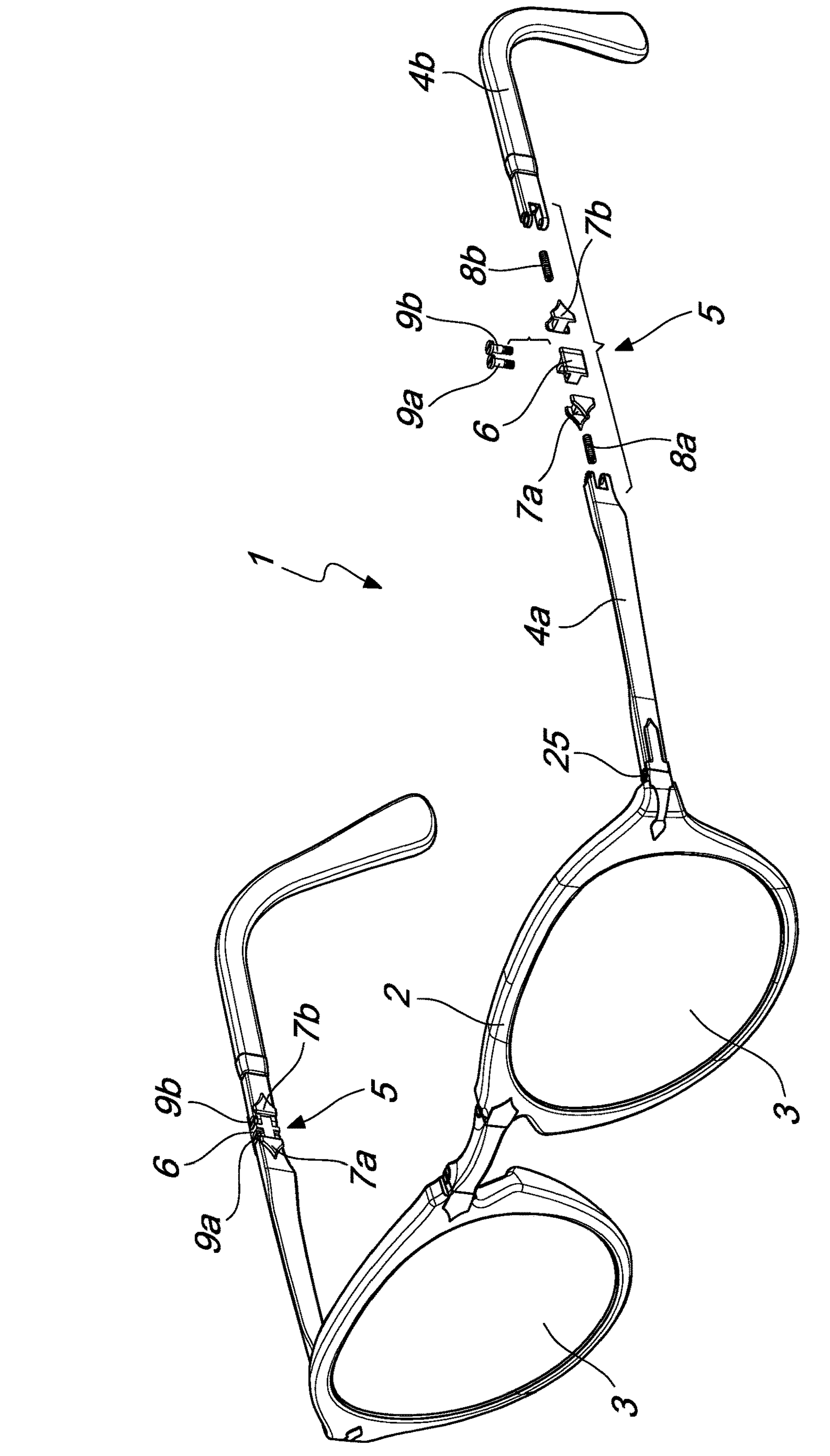
FIG. 3 is an exploded perspective view of the folding eyeglasses according to the present disclosure.
Figure 4:
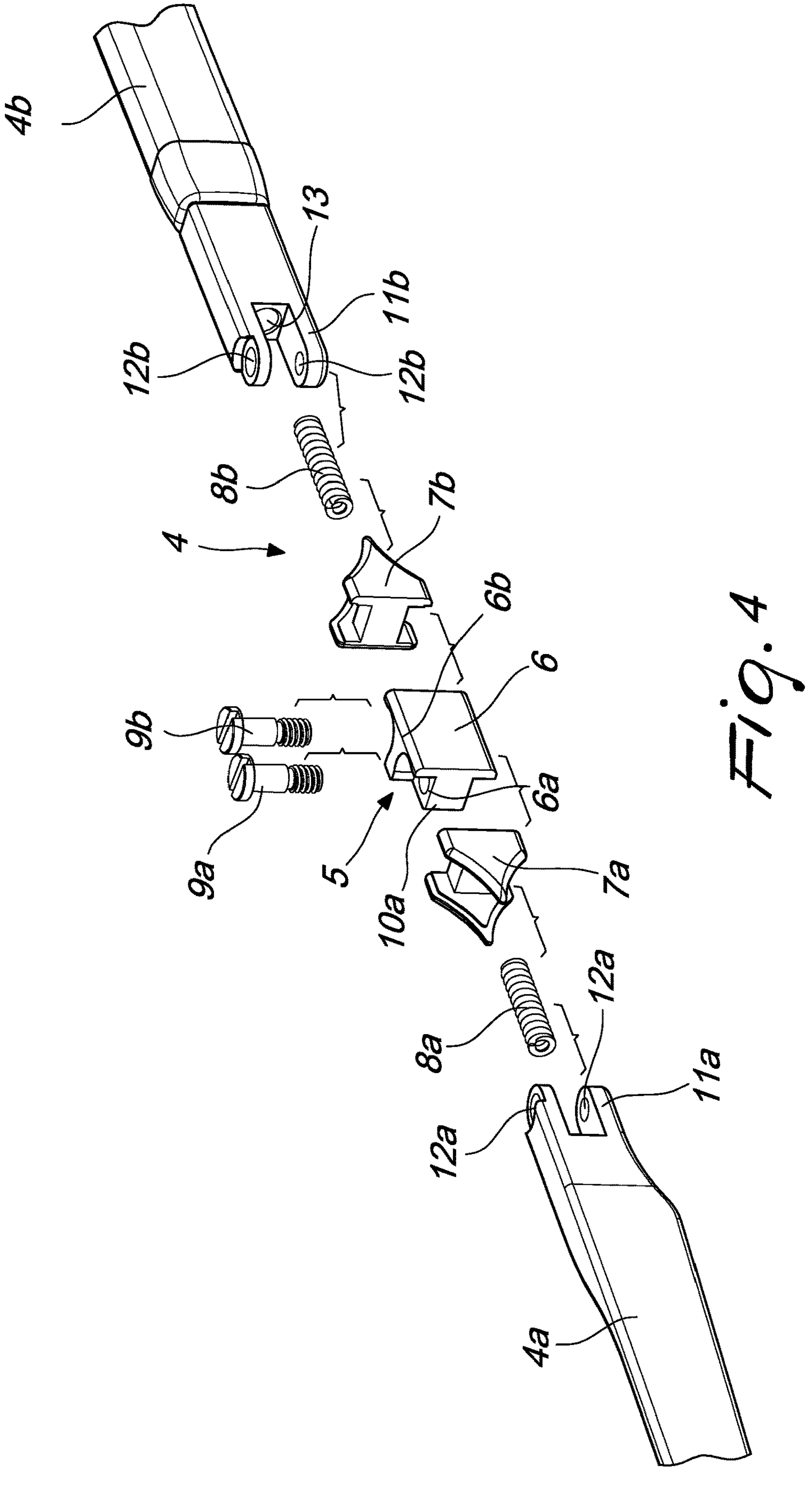
FIG. 4 is a partial exploded perspective view of the detail of the folding eyeglasses according to the present disclosure.

With reference to the figures, the folding eyeglasses according to the present disclosure, generally designated by the reference numeral 1, comprises a front 2 with a pair of lenses 3 and a pair of temples 4. The particularity of the disclosure resides in the folding method of the temples and of the front so as to move the two lenses 3 so that they are mutually superimposed and make the eyeglasses be folded with the smallest possible space occupation as regards the total thickness of the folded eyeglasses.

The temple 4 is divided into a proximal temple portion 4*a*, i.e., the temple portion connected to the front 2, and a distal temple portion 4*b*, i.e., the temple portion adapted to be rested on the ear of the user.

Between the proximal temple portion 4*a* and the distal temple portion 4*b* there is a hinge 5 which allows to fold the distal temple portion 4*b* onto the proximal temple portion 4*a*, as will be described in detail hereinafter.

In particular, the hinge 5 comprises a multi jointed hinge body 6 adapted to be arranged centrally between the proximal temple portion 4*a* and the distal temple portion 4*b*, and a first slider 7*a* adapted to mate with the proximal temple portion 4*a* and a second slider 7*b* adapted to mate with the distal temple portion 4*b*.

Springs 8*a* and 8*b* are arranged between the first and second sliders 7*a* and 7*b* and the respective temple portions 4*a* and 4*b*. Each one of the springs 8*a* and 8*b* is accommodated in a blind cavity 13 formed in the body of each proximal and distal temple portion 4*a* and 4*b* and each spring abuts against the respective slider 7*a* and 7*b*.

Each slider 7*a* and 7*b* is shaped so that it can slide on the temple body 4*a* and 4*b* in contrast with the force of the spring 8*a*, 8*b*.

Conveniently, the elastic force of the springs 8*a* and 8*b* is mutually different, and in particular the force of the spring 8*b* is smaller than the force of the spring 8*a*.

Therefore, the springs 8*a* and 8*b*, which are springs of the compression type, are compressed with different loads.

The multi jointed central body 6 of the hinge 5 is provided with a pair of holes 6*a* and 6*b*, which are arranged at respective holes 12*a*, for the proximal temple portion 4*a*, and 12*b*, for the distal temple portion 4*b*, and there are screws, respectively 9*a* and 9*b*, for fixing the central hinge body 6 to the proximal portion 4*a* and to the distal portion 4*b* of the temple 4.

Therefore, the coupling of the multi jointed central body 6 with the proximal temple 4*a* and distal temple 4*b* occurs by interposition of the respective sliders 7*a* and 7*b* and of the respective springs 8*a* and 8*b*.

Conveniently, the multi jointed central body 6 of the hinge 5 is provided with two mutually opposite cam-like portions 10*a*, 10*b* which allow the rotation of the central body 6 around the rounded portions of the ends of the proximal temple 4*a* and of the distal temple 4*b*, i.e., the portions in which the holes, respectively 12*a*, 12*b*, of the proximal portion 4*a* of the temple and of the distal portion 4*b* of said temple are formed.

The multi jointed central body 6 of the hinge 5 is a bistable mechanism which allows the 180° rotation of the distal portion 4*b* of the temple with respect to the proximal portion 4*a* of said temple, by means of vertical axes of the multi jointed hinge, and are identified by the axes of revolution of the two screws 9*a* and 9*b*.

Essentially, the bistable mechanism allows the rotation through of each one of the two joints of the temple portions 4*a* and 4*b*, where the joints are identified by the holes 12*a* and 12*b* of the two temple portions, maintaining at the same time the arrangement of the temple in the normally opened and normally closed equilibrium conditions.

The operation of the bistable mechanism in the two equilibrium conditions, i.e., in a normally open hinge condition and a normally closed hinge condition, is controlled by the force of the load applied by the compression springs, by means of the slider 7*a* and 7*b*, to the two faces of the mechanical cam 10 of the multi jointed central body 6 of the hinge 5.

The rotation of the multi jointed hinge 5 from the normally open position to the normally closed position is possible by applying a greater force to the rear joint, i.e., to the distal portion 4*b* of the temple with respect to the one applied by the compression spring 8*b*, rotating the temple up to the central rotational position (dead center), and where the remaining stroke is then followed autonomously by the mechanism by means of a snap action of the springs 8*a* and 8*b* on both sides of the joints.

Figure 5:
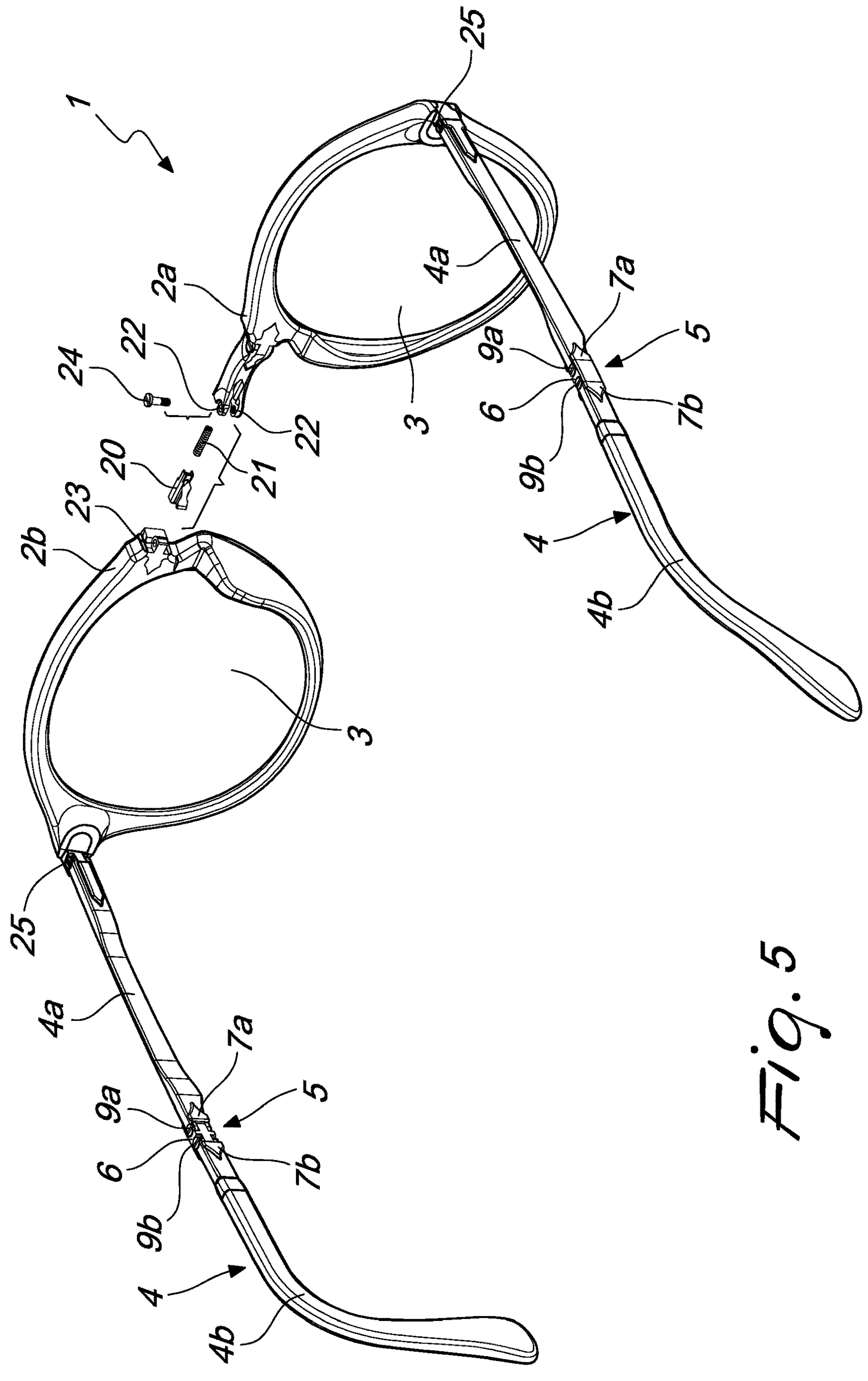
FIG. 5 is a rear perspective view of the folding eyeglasses according to the present disclosure, with the front in exploded view.
Figure 6:
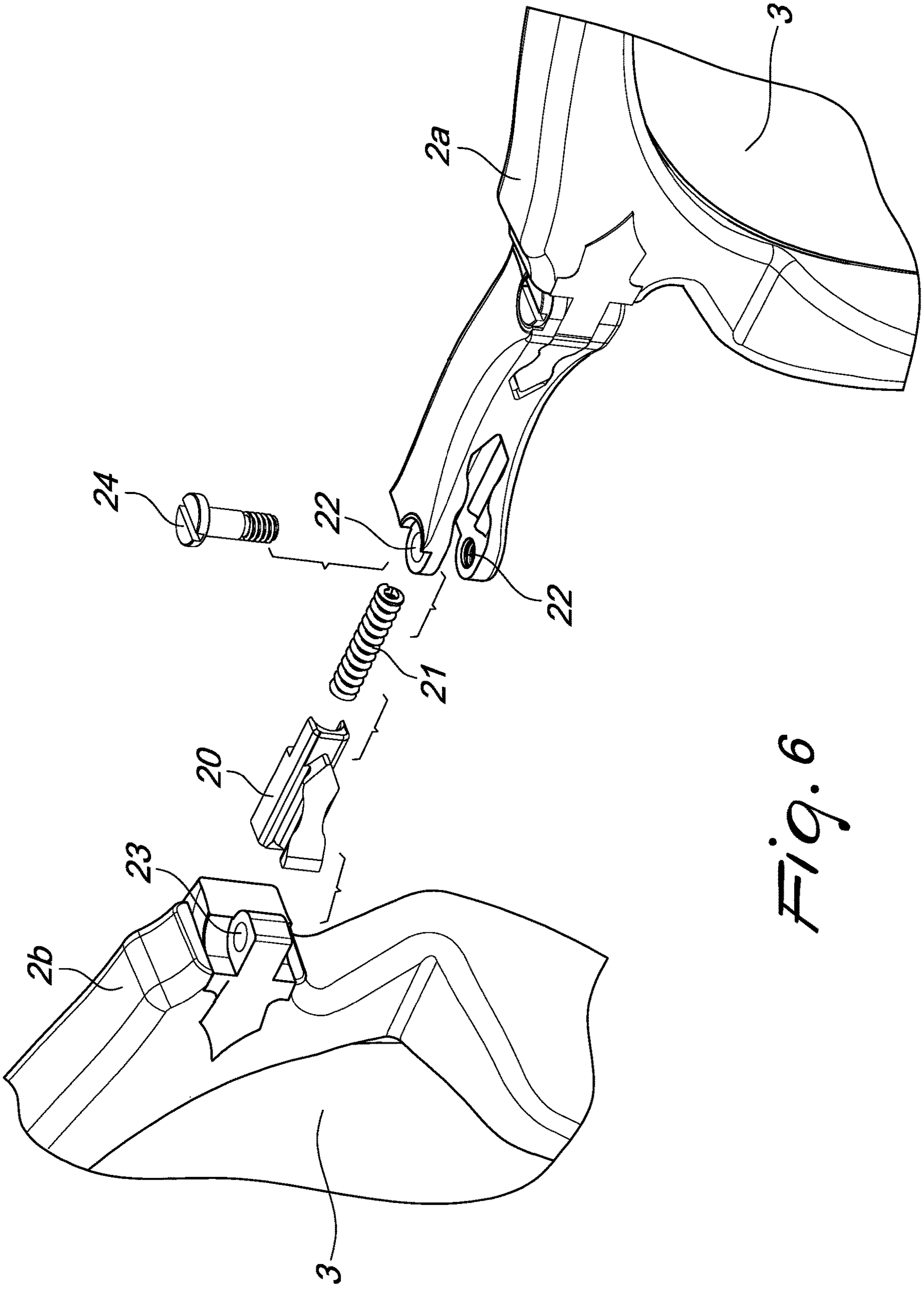
FIG. 6 is an exploded perspective view of the detail of the front of the folding eyeglasses according to the present disclosure.
Figure 8:
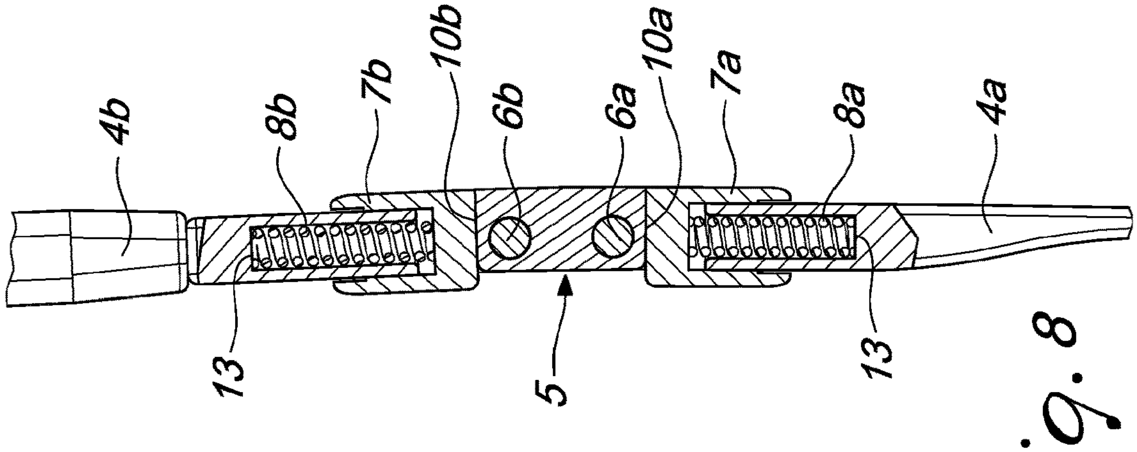
FIG. 8 is a longitudinal sectional view of the temple portion of the folding eyeglasses according to the present disclosure.

The front of the eyeglasses according to the disclosure can also be folded, as shown in detail in FIGS. 5 and 6, and therefore has in this case a slider 20 adapted to be interposed, together with a compression spring 21, between a portion 2*a* of the front and a portion 2*b* of the front, each of which, respectively, accommodates a lens 3.

In a constructive variation, the central part (bridge) that separates the two lenses is symmetrical with respect to the slider 20.

In another embodiment, the portion 2*a* of the front has an end provided with a pair of coaxial holes 22, while the portion 2*b* of the front has a single hole 23 adapted to be inserted between the two coaxial holes 22 for the mating of the two portions 2*a* and 2*b* of the front, with the interposition, as already mentioned, of the slider 20 and of the compression spring 21.

A screw 24 defines the center of rotation of the portion 2*a* of the front with respect to the portion 2*b* of the front and is inserted in the holes 22 and 23 of the two front portions.

The folding sequence of the eyeglasses according to the disclosure is shown in FIGS. 7 to 16.

Figure 7:
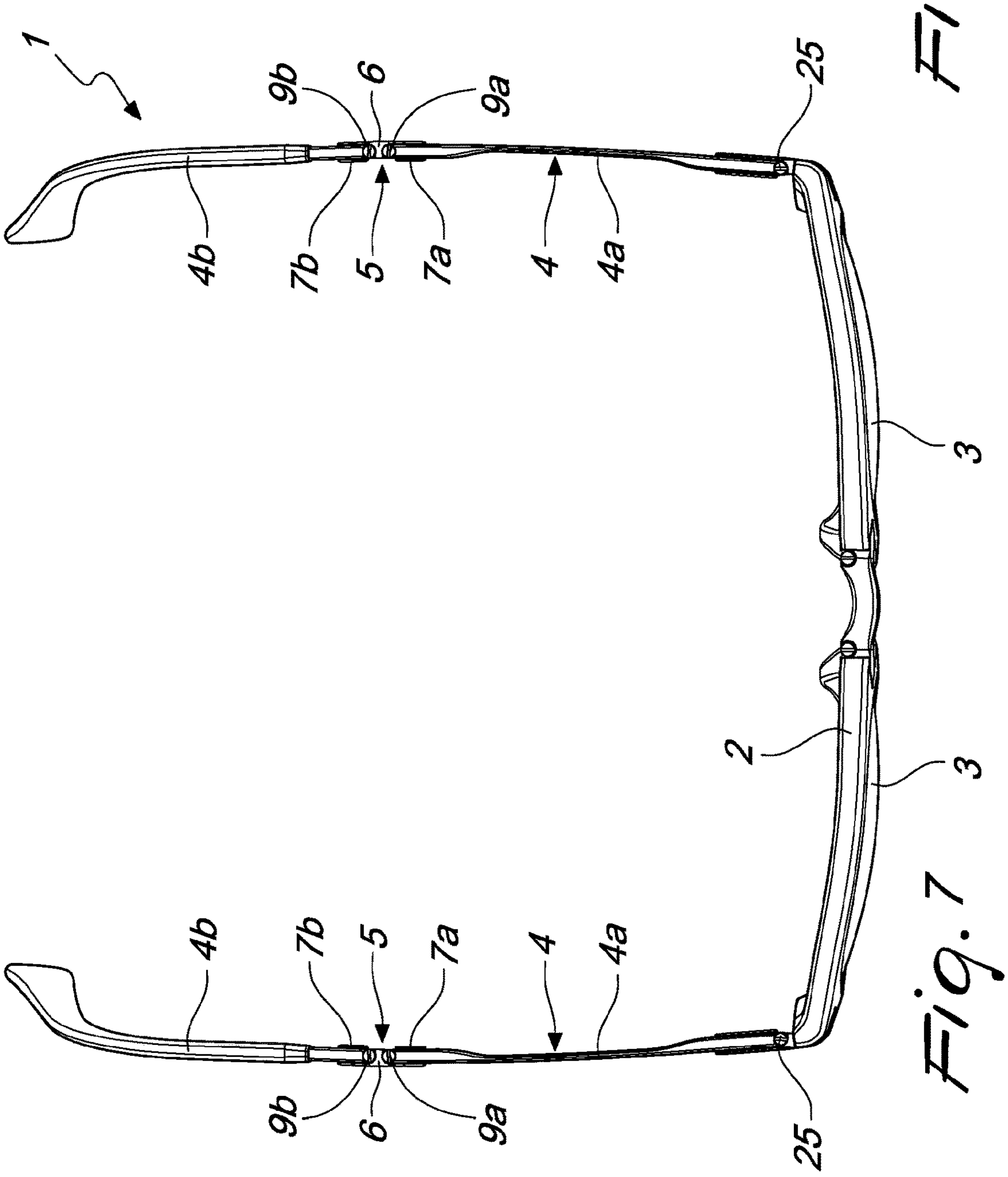
FIG. 7 is a top plan view of the folding eyeglasses according to the present disclosure.

FIG. 7 shows the eyeglasses in the open configuration, with the temple in the normally open condition.

Figure 10:
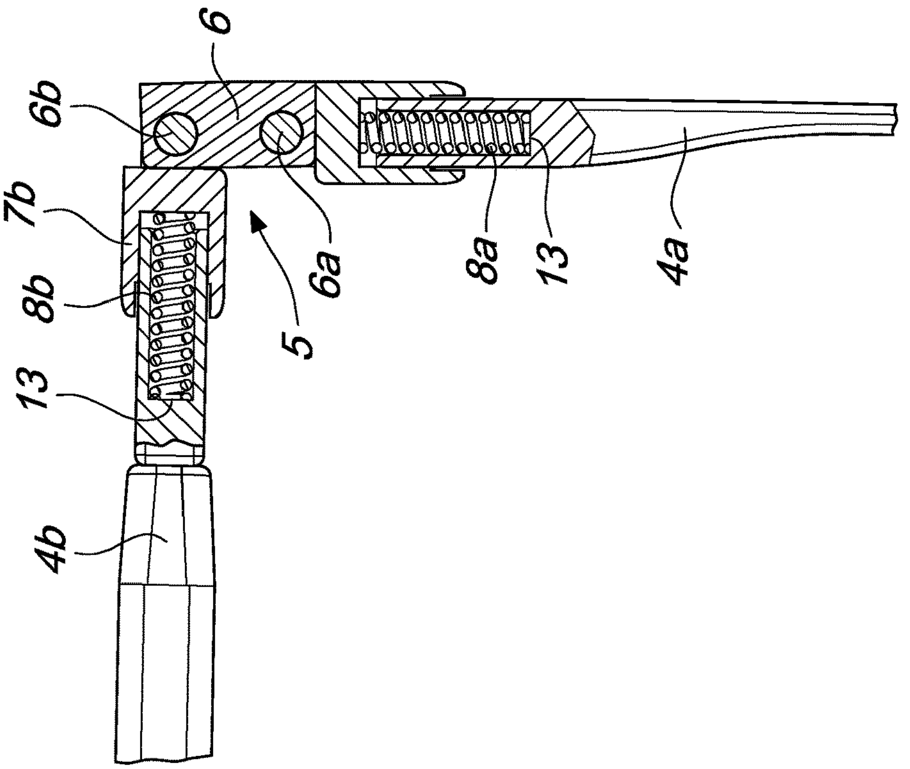
FIG. 10 is a sectional view of the detail of the first folding position of the folding eyeglasses according to the present disclosure.
Figure 9:
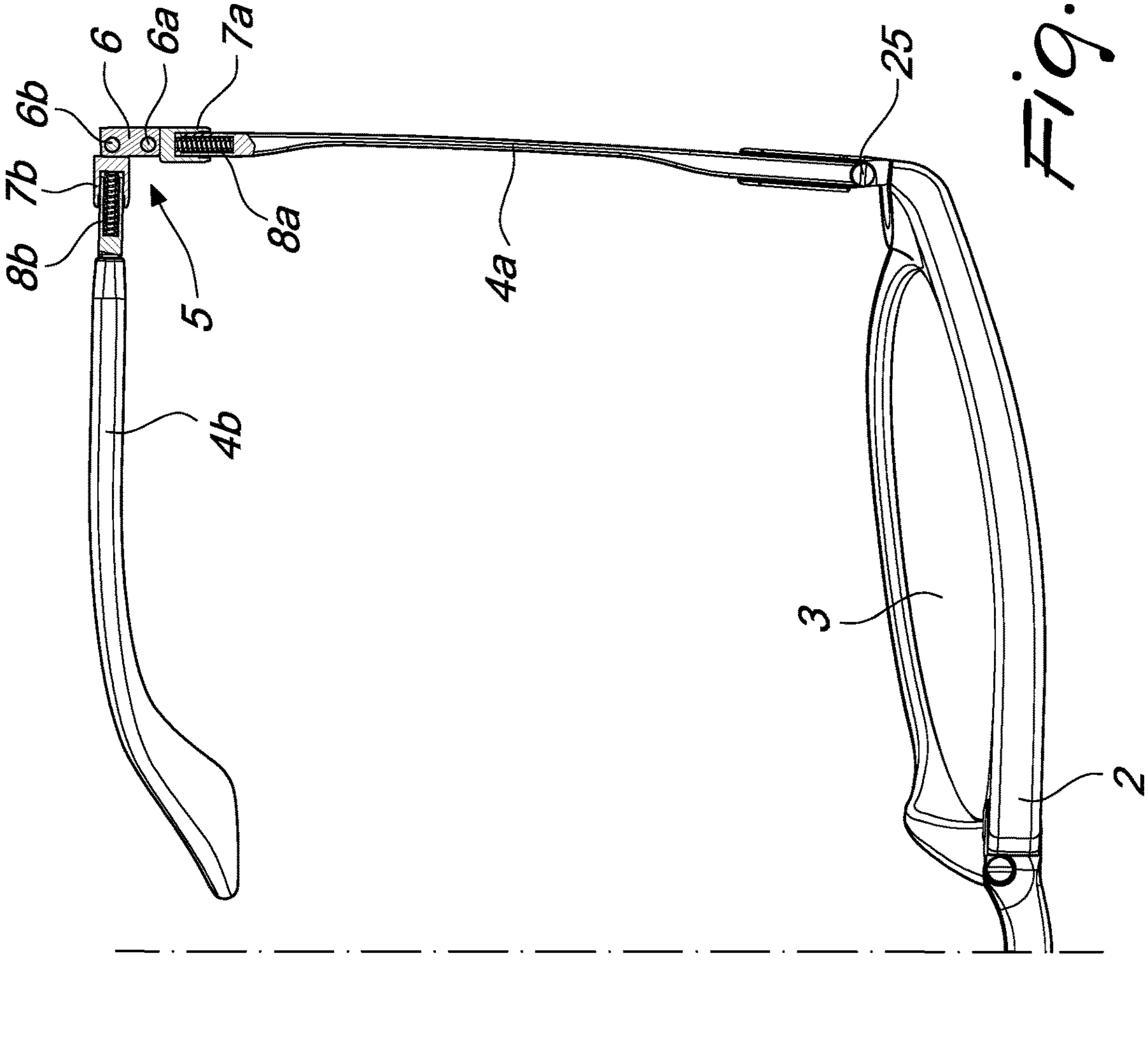
FIG. 9 is a top plan view of a first folding position of the folding eyeglasses according to the present disclosure.

FIG. 9 and the corresponding enlarged-scale sectional view of FIG. 10 show in detail the first folding step, in which the distal temple portion 4*b* is folded through 90° with respect to the proximal temple portion 4*a*. In this step there is therefore a first 90° rotation of the joint of the temple 4*b* with respect to the multi jointed body 6 of the hinge 5.

Figure 12:
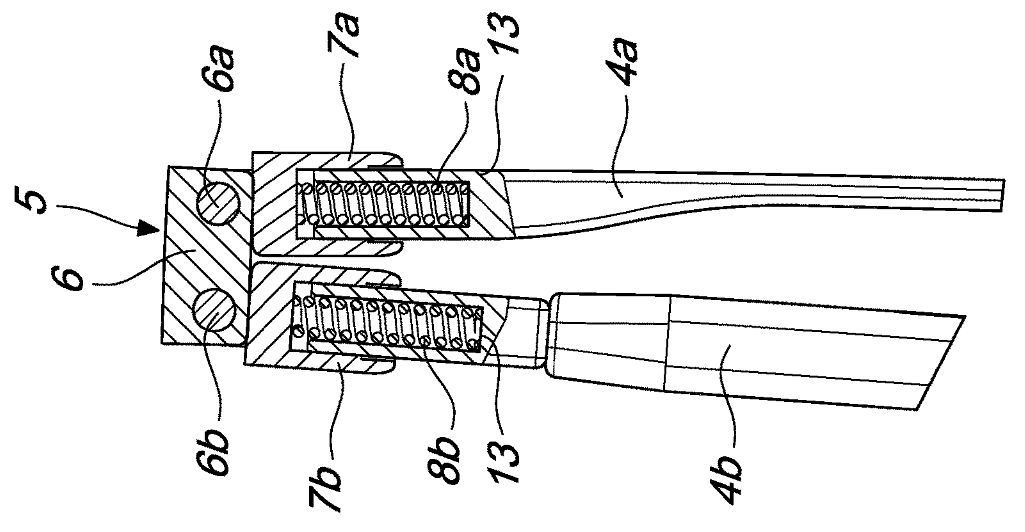
FIG. 12 is a longitudinal sectional view of the second folding step of the folding eyeglasses according to the present disclosure.
Figure 11:
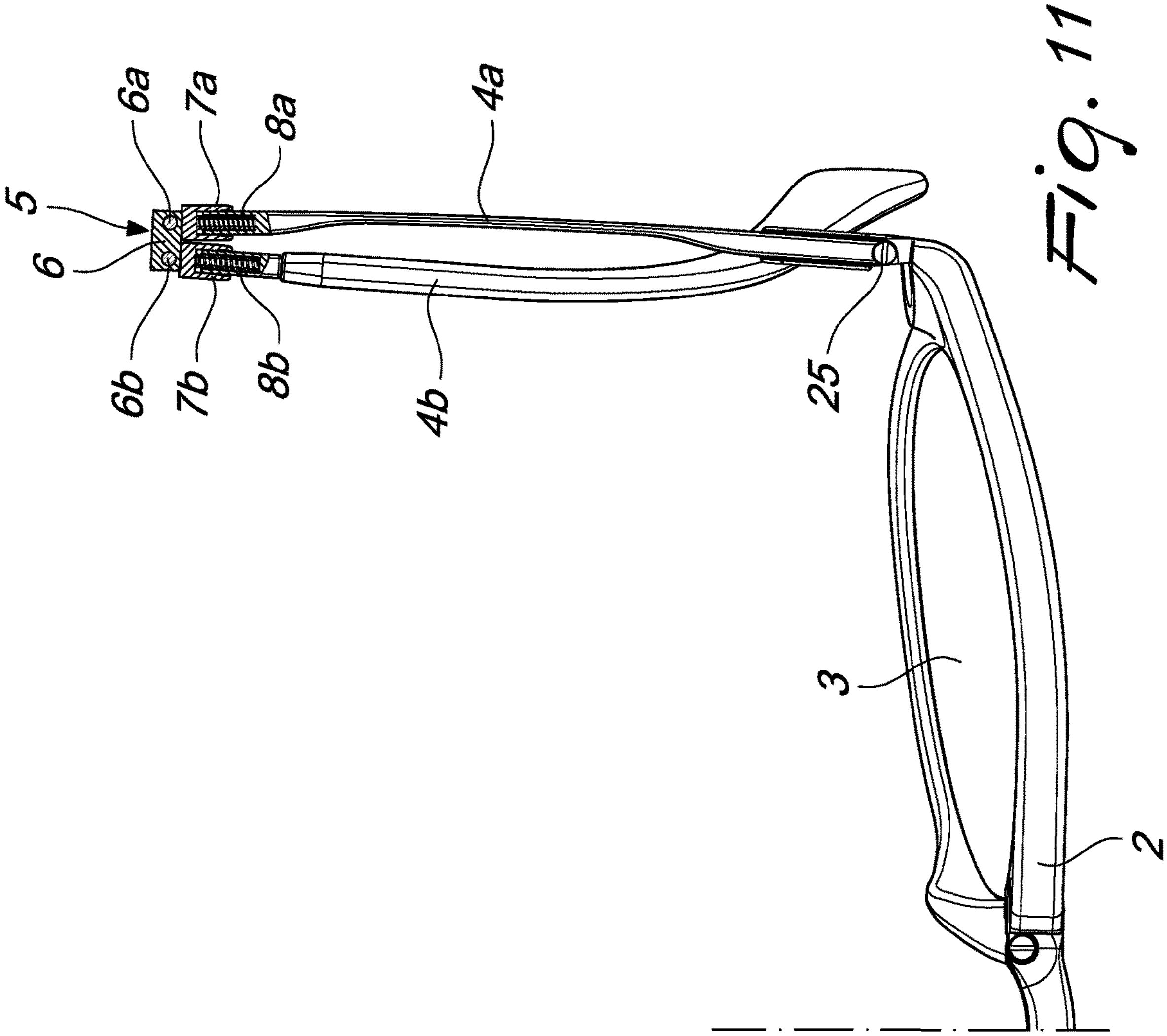
FIG. 11 is a top plan view of the second folding position of the folding eyeglasses according to the present disclosure.

FIG. 11 and FIG. 12 show a further folding step in which there is a 90° rotation of the multi jointed hinge body 6 with respect to the proximal portion 4*a* of the temple, so as to bring the hinge body 6 to a position at right angles with respect to the two portions, the proximal one 4*a* and the distal one 4*b*, of the temple 4, which in this step are mutually parallel and superimposed.

Figure 14:
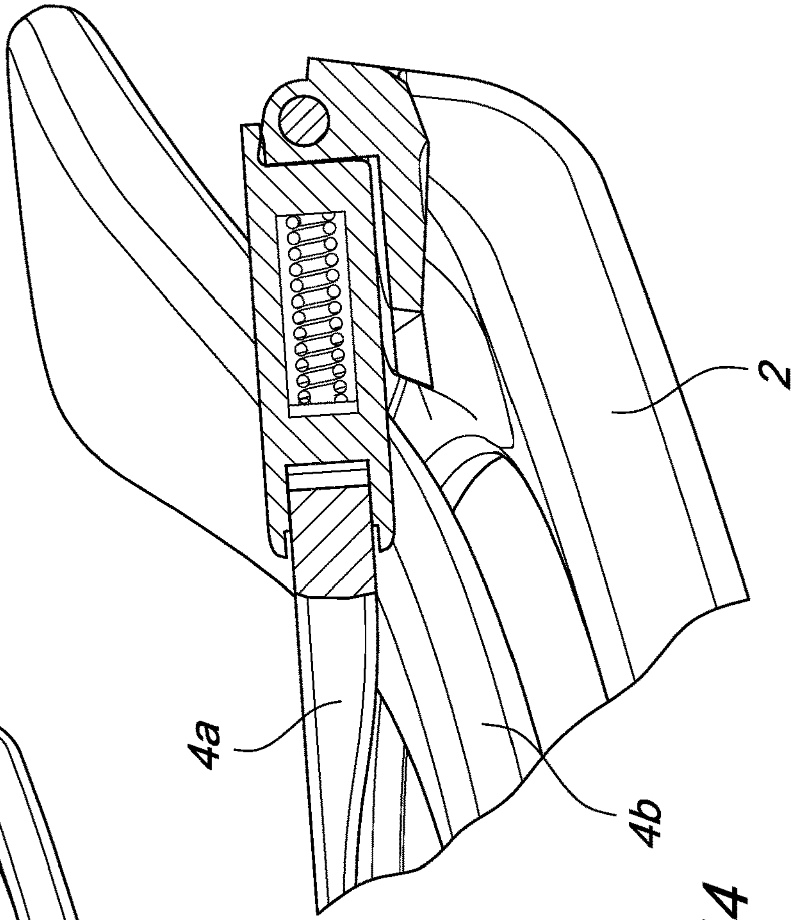
FIG. 14 is a sectional view of the detail of the third folding step of the folding eyeglasses according to the present disclosure.
Figure 13:
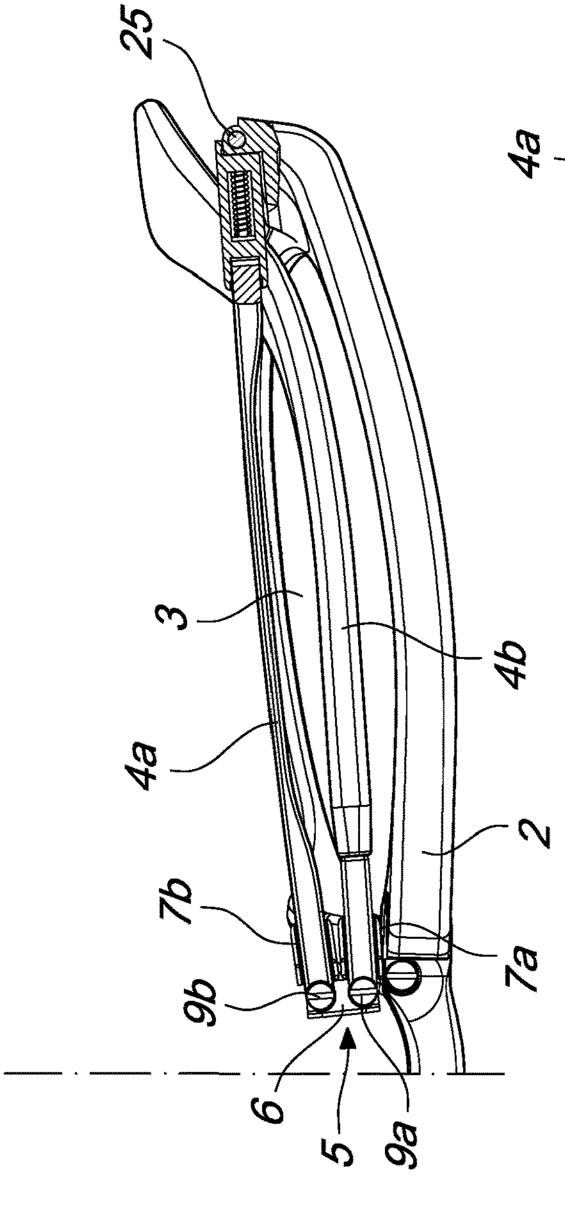
FIG. 13 is a partially sectional top plan view of the third folding step of the folding eyeglasses according to the present disclosure.
Figure 16:
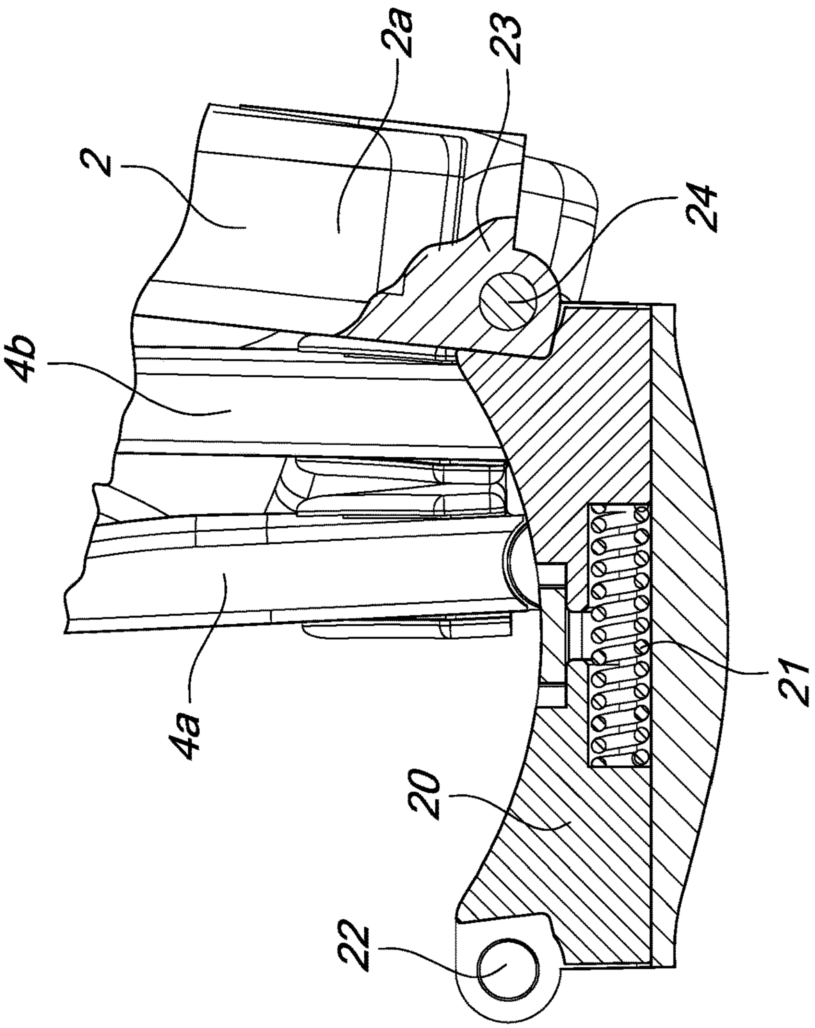
FIG. 16 is a final sectional view of the detail of the fourth folding step of the folding eyeglasses according to the present disclosure.
Figure 15:
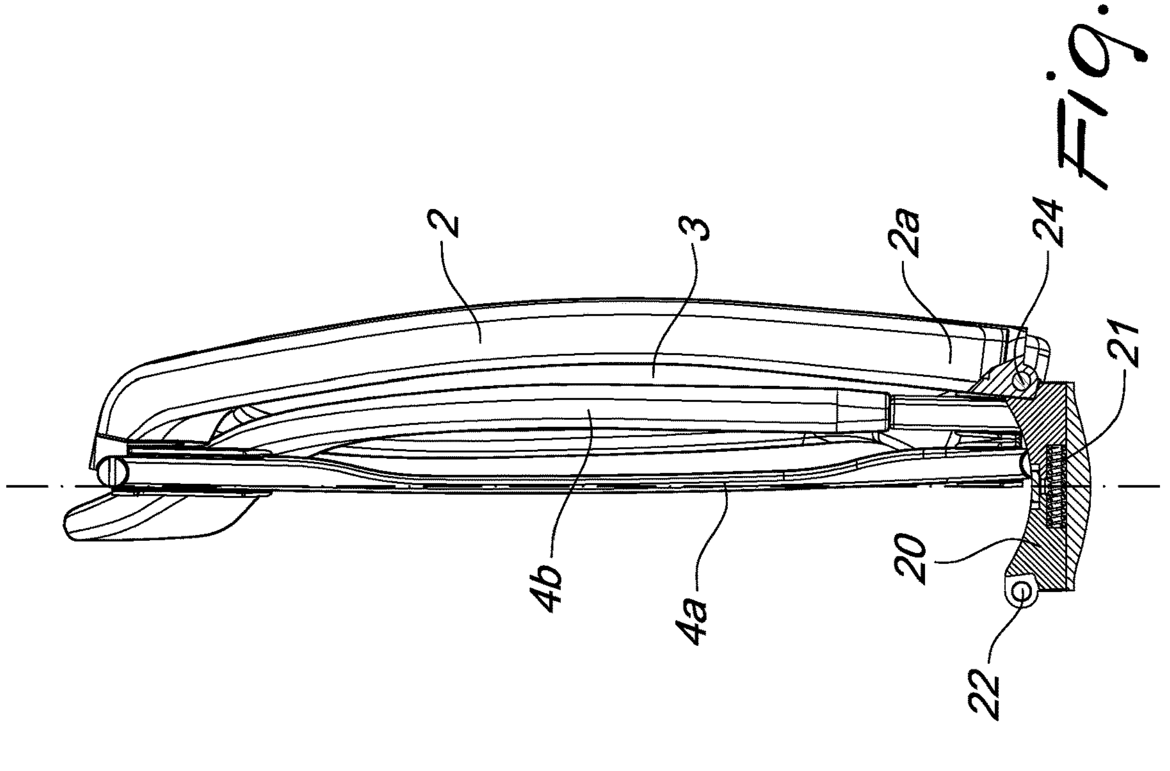
FIG. 15 is a partially sectional top plan view of the fourth folding step of the folding eyeglasses according to the present disclosure.

The folding step of FIGS. 13 and 14 shows the folding of the superimposed temples 4*a* and 4*b* onto the front 2 of the eyeglasses, by rotation of the proximal portion 4*a* of the temple 4 with respect to the hinge point 25 between the proximal portion 4*a* of the temple and the front 2.

In fact, the folding provides for folding each one of the temples 4 in the manner described above, by moving them in a folded condition into contact with each respective lens 3, and finally for folding one lens 3 onto the other by using the central hinge arranged between the two lenses 3, i.e., by folding the front portion 2*a* on the portion 2*b*.

In this manner a packing of the eyeglasses in the smallest possible space is obtained, with the two temples 4 folded and arranged mutually parallel between the two front portions 2*a* and 2*b*, in order to form a package.

In practice it has been found that the folding eyeglasses according to the disclosure fully achieves the intended aim and advantages, since it allows to be folded in a simple manner by the user, occupying the smallest possible space once folded, in terms of thickness of the package thus obtained.

The folding eyeglasses thus conceived are susceptible of numerous modifications and variations, all of which are within the scope of the accompanying claims.

In practice, the materials used, as well as the contingent shapes and dimensions, may be any according to the requirements and the state of the art.

The invention claimed is:

1. Folding eyeglasses, comprising a front which supports a pair of lenses and a pair of temples hinged to the front, each one of said temples comprising a proximal portion and a distal portion which are mutually hinged by a hinge, wherein said hinge comprises a multi-jointed central body configured to allow a first 90° rotation of the distal portion of the temple, and a further 90° rotation of the multi-jointed central body with respect to the proximal portion of the temple, in order to arrange the proximal portion of the temple and the distal portion of the temple so that they are mutually parallel and superimposed, wherein said multi-jointed central body of the hinge is interposed between said proximal portion and said distal portion of the temple by the interposition, at each side, of a slider, which is adapted to mate respectively with the proximal portion and with the distal portion of the temple by the interposition of a respective compression spring, said slider being adapted to slide respectively on said proximal portion and said distal portion of the temple and being configured to both slide and rotate with respect to said multi-jointed central body.

2. The folding eyeglasses according to claim 1, wherein said multi-jointed central body of the hinge is provided with respective holes which are adapted to mate with holes arranged at ends of said proximal portion and said distal portion of the temple, by respective screws.

3. The folding eyeglasses according to claim 1, wherein said multi-jointed central body of the hinge comprises two mutually opposite cam portions which are adapted respectively to rotate about rounded ends of said proximal portion and of said distal portion of the temple, said rounded ends forming the holes of said proximal portion and said distal portion of the temple.

4. The folding eyeglasses according to claim 1, wherein said respective compression spring of said distal portion of the temple has a smaller force than said respective compression spring of said proximal portion of the temple.

5. The folding eyeglasses according to claim 1, wherein said front comprises a first front portion and a second front portion which are mutually hinged by the interposition of a slider and a spring.

6. The folding eyeglasses according to claim 1, wherein said respective compression springs of said distal portion and said proximal portion of the temple are accommodated in a blind cavity formed at said distal portion and at said proximal portion of said temple.

7. The folding eyeglasses according to claim 6, wherein said respective compression spring abuts between said blind cavity of said distal portion and of said proximal portion of the temple and the respective slider.

8. The folding eyeglasses according to claim 1, wherein the multi-jointed central body of the hinge is a bistable mechanism.

9. The folding eyeglasses according to claim 8, wherein said bistable mechanism allows the 180° rotation of the distal portion of the temple with respect to the proximal portion of said temple, by vertical axes of the multi-jointed hinge.

10. A method for folding folding eyeglasses according to claim 1, the method including the following steps:

for each one of said temples, starting from an open condition of said eyeglasses, rotating through 90° said distal portion of the temple with respect to said proximal portion of the temple, said multi-jointed central body of the hinge remaining in the normal open position, rotating further through 90° said distal portion of the temple so as to cause said multi-jointed central hinge body to rotate with respect to said proximal portion of the temple, so as to arrange said proximal portion of the temple and said distal portion of the temple so that they are mutually parallel and superimposed, and folding the front of the eyeglasses so as to arrange first and second portions of the front so that one is superimposed on another, with said folded temples interposed.

* * * * *